(12) United States Patent
Roberts et al.

(10) Patent No.: US 6,612,422 B2
(45) Date of Patent: Sep. 2, 2003

(54) CONVEYOR ROLLER ASSEMBLY

(75) Inventors: Aaron J Roberts, Jamestown, ND (US); Stephen J Senger, Jamestown, ND (US); Wallace H Larson, Jamestown, ND (US); Garreth J Kavlie, Jamestown, ND (US)

(73) Assignee: Lucas Western Inc., Jamestown, ND (US)

( * ) Notice: Subject to any disclaimer, the term of this patent is extended or adjusted under 35 U.S.C. 154(b) by 0 days.

(21) Appl. No.: 10/038,489

(22) Filed: Dec. 21, 2001

(65) Prior Publication Data
US 2002/0104734 A1 Aug. 8, 2002

(30) Foreign Application Priority Data
Dec. 29, 2000 (GB) .............................. 0031756

(51) Int. Cl.⁷ ................................ B65G 13/06
(52) U.S. Cl. ...................... 198/788; 198/835
(58) Field of Search .................. 198/788, 835

(56) References Cited

U.S. PATENT DOCUMENTS

| | | | |
|---|---|---|---|
| 3,713,521 A | | 1/1973 | Moritake |
| 3,918,561 A | | 11/1975 | Isacsson |
| 5,088,596 A | * | 2/1992 | Agnoff ...................... 198/788 |
| 5,127,513 A | * | 7/1992 | Huber ...................... 198/782 |
| 5,131,527 A | * | 7/1992 | Huber ...................... 198/782 |
| 5,131,529 A | * | 7/1992 | Dorner ...................... 198/835 |
| 5,215,184 A | * | 6/1993 | Huber ...................... 198/782 |
| 5,927,479 A | * | 7/1999 | Merten et al. ............... 198/834 |
| 6,035,999 A | | 3/2000 | Hall |
| 6,125,993 A | * | 10/2000 | Hansson ...................... 198/788 |
| 6,244,427 B1 | * | 6/2001 | Syverson ...................... 198/788 |
| 6,328,154 B1 | * | 12/2001 | Huber ...................... 198/782 |
| 6,443,295 B1 | * | 9/2002 | Hill ............................ 198/788 |

OTHER PUBLICATIONS

"Das Sanfte Staufordersystem", Technische Rundschau, Hallwag Verlag. Bern, CH, vol. 85, NR. 42, pp. 61–62 XP000398138 ISSN: 1023–0823 the whole document.

* cited by examiner

Primary Examiner—Christopher P. Ellis
Assistant Examiner—Rashmi Sharma
(74) Attorney, Agent, or Firm—Andrus, Sceales, Starke & Sawall

(57) ABSTRACT

A conveyor roller assembly comprising a supporting bracket through which the roller assembly can be fixed in use, a hollow, generally cylindrical roller shell supported for rotation about its longitudinal axis on the bracket, an electrical generator housed within the roller shell and driven thereby by rotation of the shell to produce an electrical output, a brake within the roller shell and operable to brake rotation of the shell relative to the bracket, a speed sensor within the shell for sensing the speed of rotation of the shell relative to the bracket, and, an actuator powered by the electrical output of the generator when the speed sensor detects that the speed of rotation of the shell relative to the bracket exceeds a predetermined value, to effect operation of the brake to brake rotation of the shell.

8 Claims, 9 Drawing Sheets

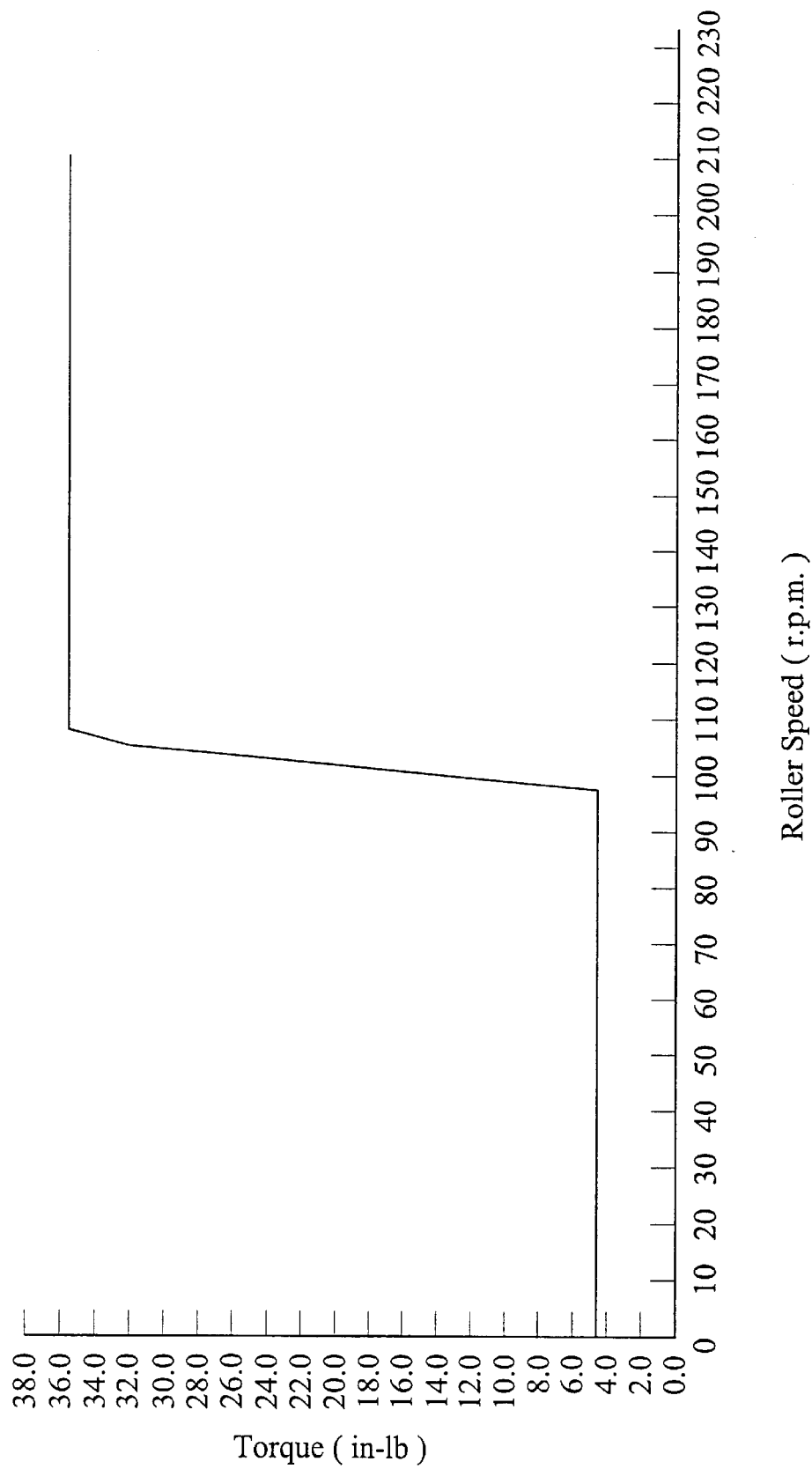

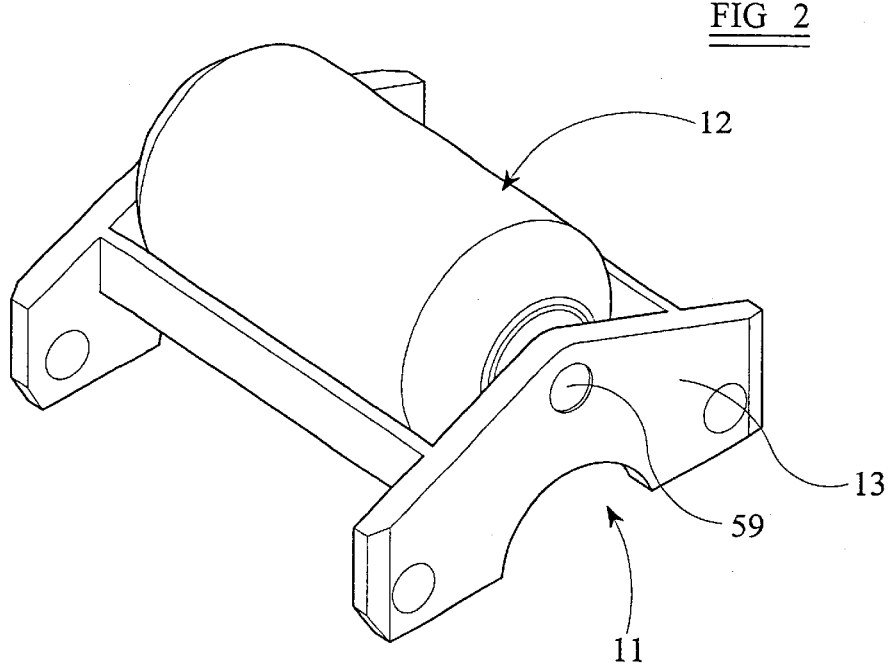
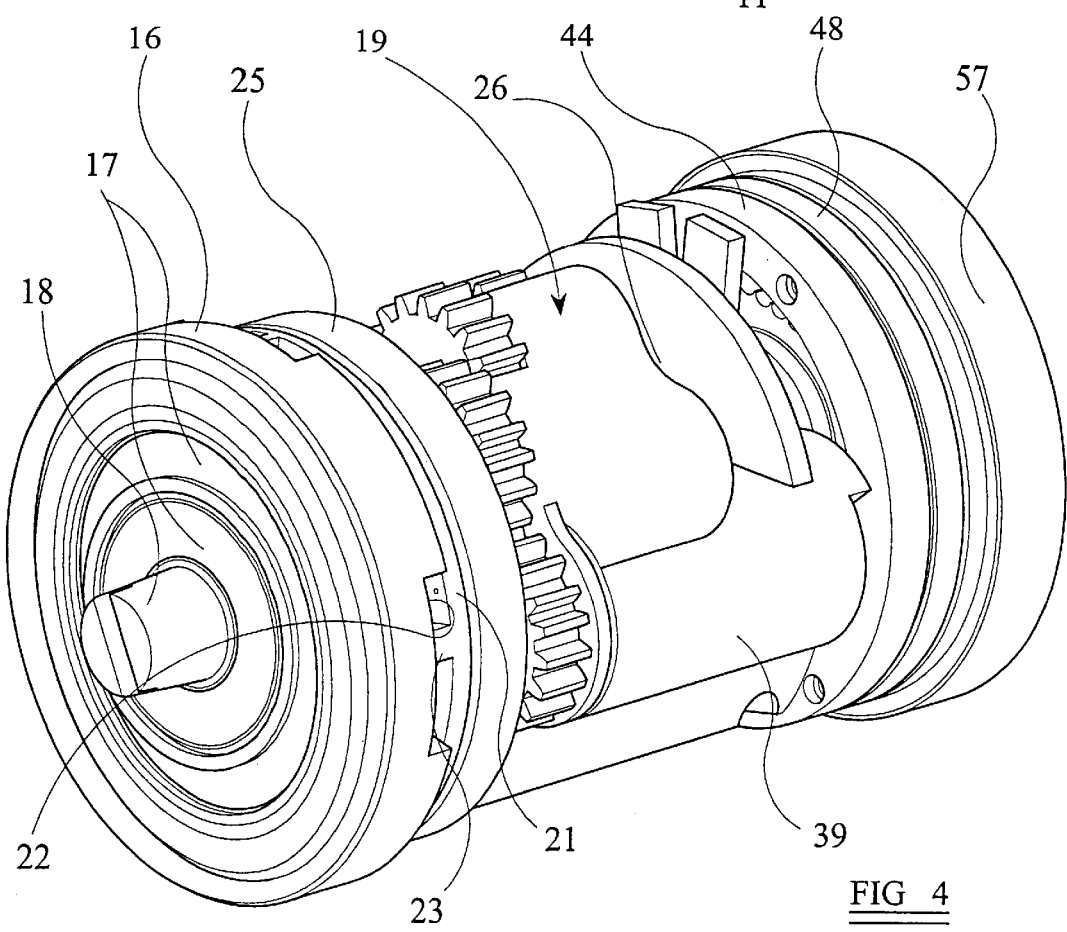

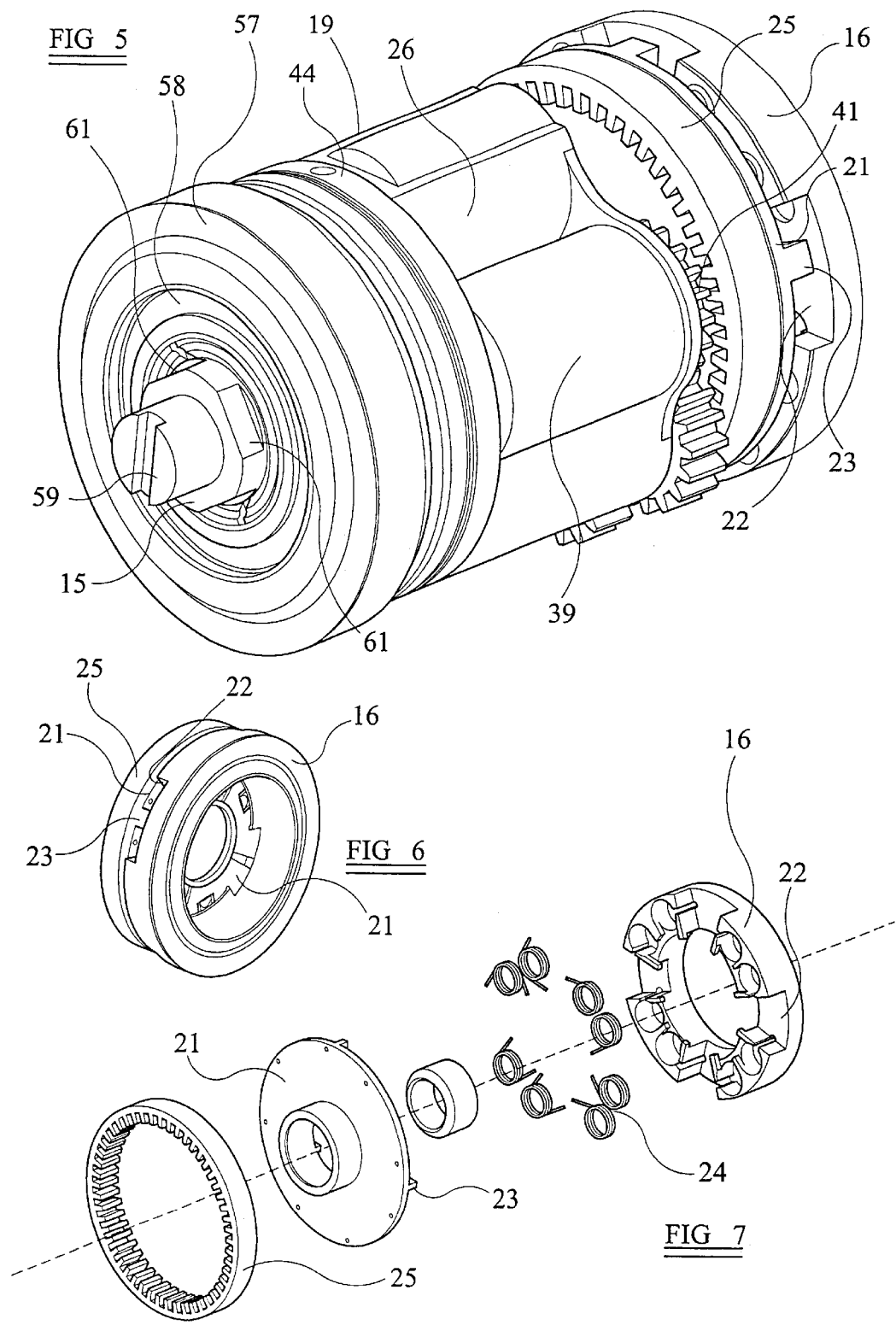

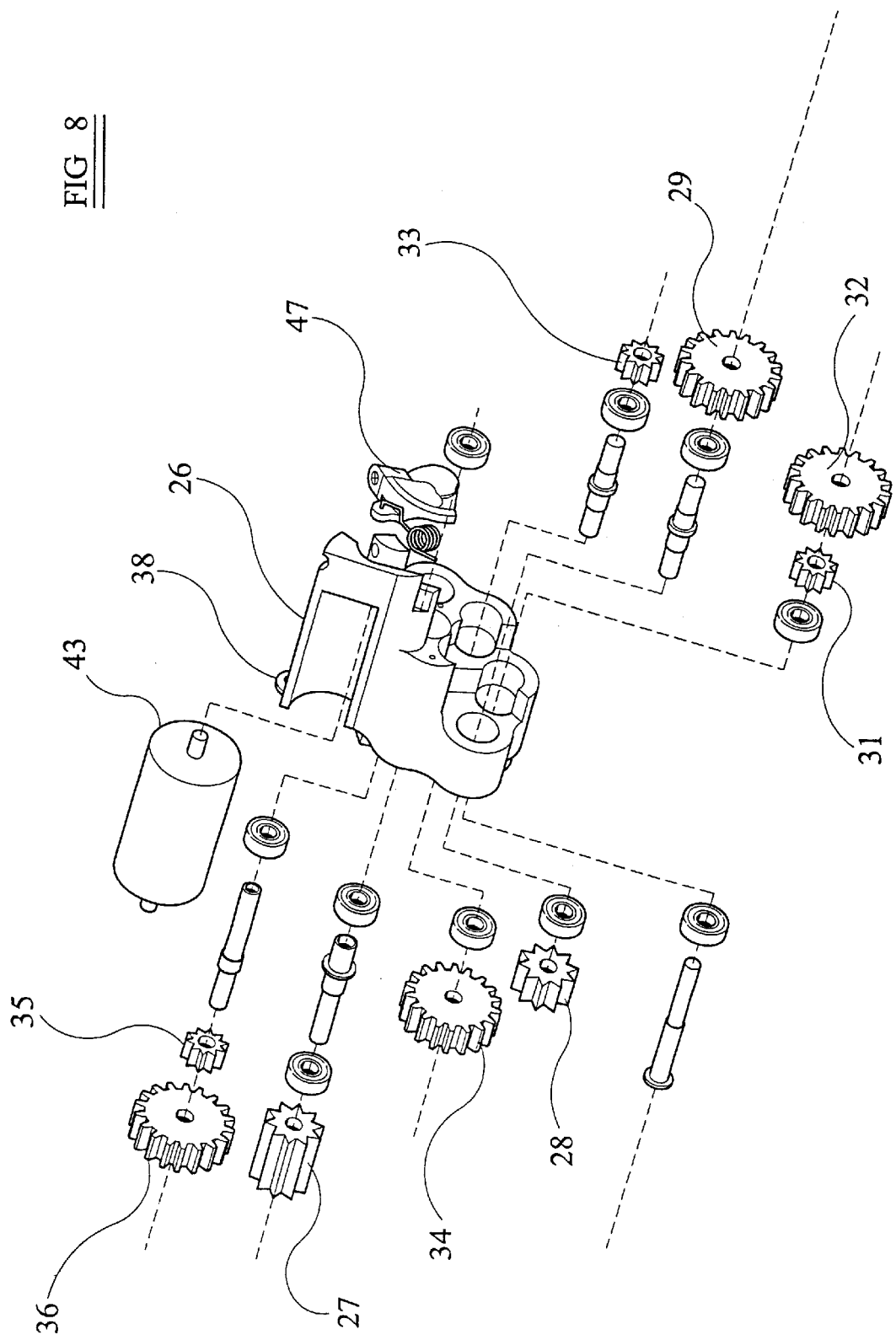

CONVEYOR ROLLER ASSEMBLY

This invention relates to a conveyor roller assembly particularly intended for use in an aircraft cargo conveying system.

It is well known to provide the floor of the cargo bay of an aircraft with a plurality of rollers aligned with their axes of rotation parallel or substantially parallel to define tracks along which palletised cargo loads (hereinafter known as unit load devices [ULD's]) are moveably supported by the rollers, the rollers providing a low friction transport for the ULD's. It is also known to provide similar rollers on one or more inclined loading ramps up and down which ULD's are transported to and from the cargo bay of the aircraft.

ULD's typically have a high friction lower surface which engages the rollers, but since the rollers themselves have very little rotational resistance then the ULD's are relatively free to move, when pushed, or otherwise driven, in a direction at right angles to the rotational axes of the rollers.

It is an object of the present invention to provide a conveyor roller assembly for an aircraft cargo handling system in which control over the speed of movement of ULD's can be effected. It is a further object of the invention to provide a cargo roller which has a braking torque at a predetermined speed of rotation in one or both directions, but is free to rotate at all speeds below sid predetermined speed in either direction. Where the roller is arranged to provide braking in one rotational direction only, it is free to rotate at all speeds in the opposite direction.

In accordance with the present invention there is provided a conveyor roller assembly comprising a support through which the roller assembly can be fixed in use, a hollow, generally cylindrical roller shell supported for rotation about its longitudinal axis on said support, an electrical generator housed within said roller shell and driven thereby by rotation of the shell to produce an electrical output, a brake within said roller shell and operable to brake rotation of said shell relative to said support, a speed sensor within said shell for sensing the speed of rotation of said shell relative to said support, and, an actuator powered by the electrical output of said generator when said speed sensor detects that the speed of rotation of said shell relative to said support exceeds a predetermined value, to effect operation of said brake to brake rotation of the shell.

Preferably a shock absorbing mechanism is interposed between the roller shell and the drive input of said generator to cushion any sudden speed changes of the roller shell relative to said support.

Conveniently said shock absorbing mechanism comprises first and second components capable of limited relative rotation and resilient means interposed between the components to transmit drive therebetween.

Desirably rotation of said roller shell is transmitted to said generator means through the intermediary of a step-up gearbox within the roller shell.

Preferably said speed sensor is arranged also to determine the direction of rotation of the shell relative to said support whereby said actuator may be actuated by rotation of the roller shell relative to said support in one direction only.

Conveniently said actuator includes an electromechanical mechanism for linking said shell to a brake component rotatable with the shell relative to a stationary brake component with which it makes frictional contact.

Desirably said electromechanical mechanism includes a solenoid and a pawl moved by energisation of the solenoid to link the roller shell to said brake component.

Preferably said speed sensor includes at least one Hall Effect device and one or more permanent magnets movable with said roller shell relative to said device.

One example of the invention is illustrated in the accompanying drawings wherein:

FIG. 1 is a graph illustrating the desired roller speed against resistance to rolling characteristics of the conveyor roller;

FIG. 2 is a diagrammatic perspective view of a conveyor roller assembly;

FIG. 4 is a diagrammatic perspective view of the roller of FIG. 3 assembled, and with the outer shell omitted;

FIG. 5 is a view similar to FIG. 4 from the opposite axial end of the roller;

FIG. 6 is a diagrammatic perspective view of a shock absorber component of the drive arrangement of the roller;

FIG. 7 is an exploded perspective view of the shock absorber of FIG. 6;

FIG. 8 is an exploded perspective view of a step-up gearbox assembly of the roller;

Figure 3:
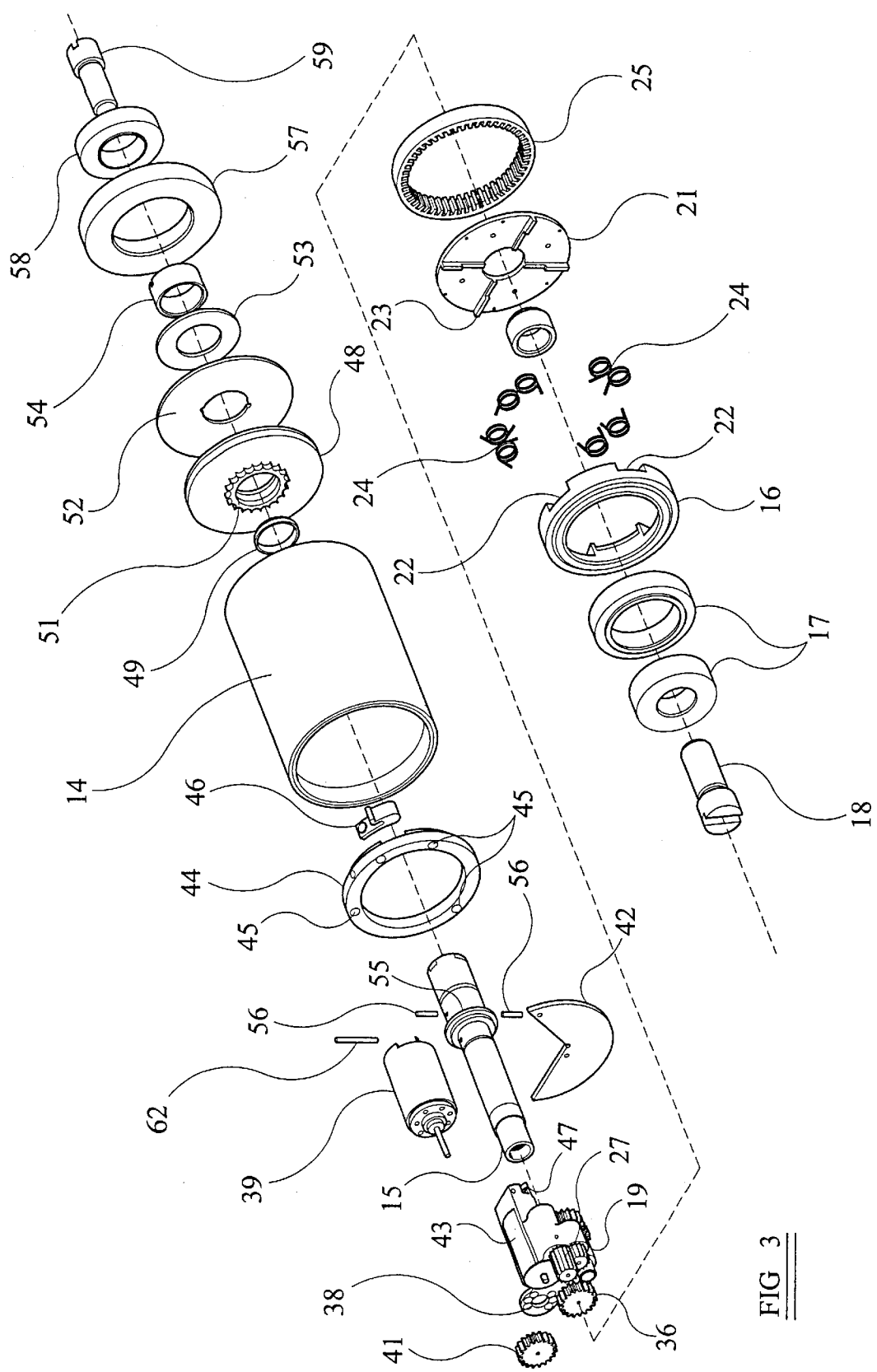
FIG. 3 is an exploded diagrammatic view of the roller of the assembly of FIG. 2.
Figure 9:
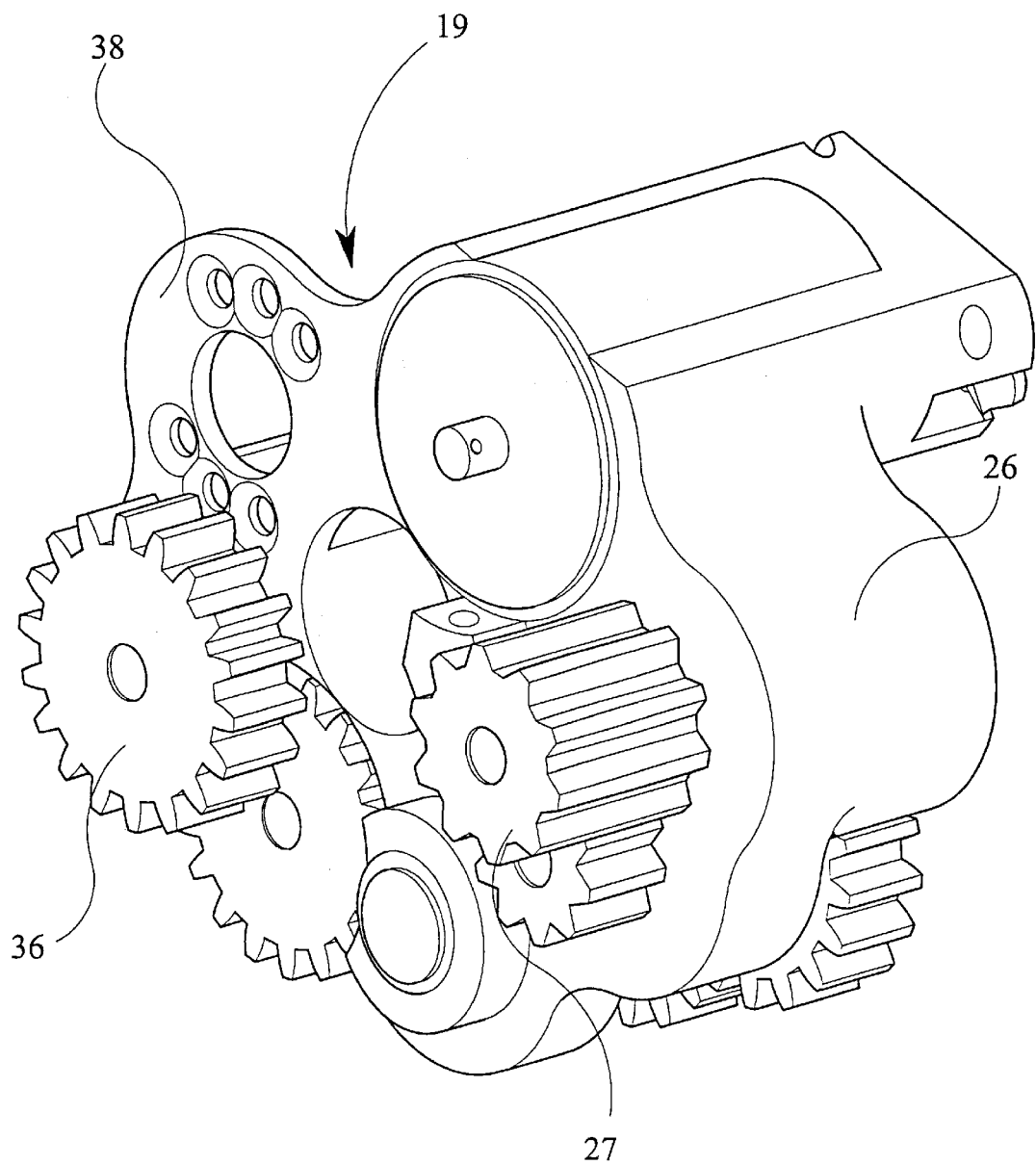
FIG. 9 is a diagrammatic perspective view of the gearbox assembly.
Figure 10:
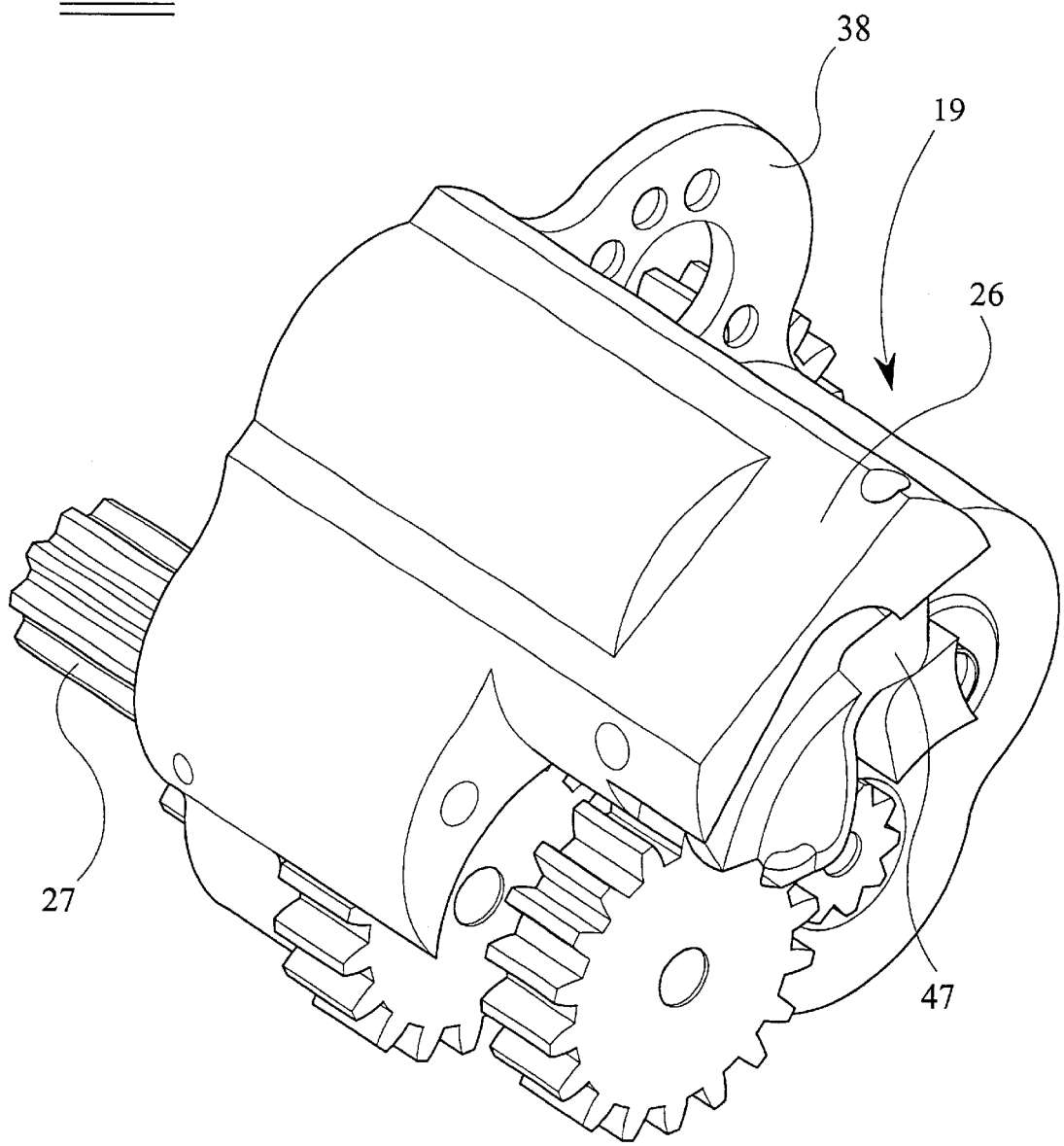
FIG. 10 is a view similar to FIG. 9 from the opposite axial end of the assembly.

Referring to the drawings, it can be seen from FIG. 1 that the objective is to provide a cargo roller which has minimal rolling resistance up to a rotational speed of approximately 100 revolutions per minute, and thereafter has a very greatly increased rolling resistance. A cargo roller in accordance with the present invention will find use in, for example, cargo bays of aircraft where it is necessary to maintain control over the maximum speed at which ULD's are moved on the roller tracks of the cargo bay. Additionally such a roller may find use on the inclined loading ramps used for conveying ULD's from a cargo or baggage handling area to the cargo bay of an aircraft. It should be recognised, however, that the conveyor roller in accordance with the present invention is not restricted to such use.

It will be recognised that when handling a ULD on a roller track it is desirable that the roller should impart minimum resistance to movement of the ULD during normal handling. However, it is important for safety reasons that the speed of the ULD's does not exceed safe values. A cargo roller assembly in accordance with the present invention is able to impose a braking force on a ULD if the speed of rotation of the roller exceeds a predetermined value, for example 100 revolutions per minute. Naturally the roller could be used to control speed of movement of ULD's, for example, within the cargo bay or on the loading ramp of an aircraft, and may also find application outside the aircraft industry.

FIG. 2 shows the general construction of the conveyor roller assembly 11 in which a generally cylindrical roller 12 of circular cross-section having an external diameter of 45 mm (1.77 inches) and a length of 66 mm (2.61 inches) is mounted for rotation in a supporting bracket 13 which in use provides the mounting means of the roller 12. A shaft assembly is fixed to the bracket 13 and extends axially through the roller 12 there being bearings supporting the roller 12 on the non-rotatable shaft assembly. The supporting bracket 13 has apertures whereby the bracket may be bolted to the assembly of, for example, the loading ramp.

FIG. 3 illustrates the roller 12 of the conveyor roller assembly 11 in an exploded form. The outer cylindrical surface of the roller is defined by a cylindrical roller shell 14 which conveniently is formed from stainless steel and is coated externally with a non-metallic friction material to co-operate with similar friction material on the lower surface of a ULD. A shaft 15 is fixed in use to the supporting bracket 13 and extends co-axially through the shell 14. At one axial end of the shell 14 the shell receives, as a press fit, an annular collar 16, engagement of the collar 16 in the shell 14 being such that the collar rotates with the shell in use. A bearing assembly 17 is received within the collar 16 and engages the shaft 15 rotatably to support the one axial end of the shell 14 on the shaft 15. A counter bore in the end of the shaft 15 receives an end screw 18 to position the roller assembly in the bracket 13 (FIG. 2).

The collar 16 defines the input member of a drive attenuator or shock absorber through which rotation of the shell 14 relative to the shaft 15 is transmitted to an input gear of a step-up gearbox 19 to be described hereinafter. In addition to the collar 16 the shock absorber comprises a dog plate 21 mounted for rotation on the shaft 15 and lying parallel to the collar 16. The face of the collar 16 presented to the plate 21 has four equiangularly spaced circumferentially extending cut-outs 22 which receive respective axially extending dogs 23 projecting from the face of the plate 21. The difference in circumferential dimension between the width of the dogs 23 and the width of the cut-outs 22 defines the circumferential freedom of the plate 21 relative to the collar 16. However, interposed between the collar 16 and the plate 21 are a plurality of torsion springs 24 which couple the plate 21 to the collar 16 and urge the plate 21 to a position relative to the collar 16 in which the dogs 23 are disposed centrally in the cut-outs 22. An annular ring gear 25 having gear teeth on its inner periphery is secured to the plate 21 concentric with the shaft 15. It will be recognised that if the ring gear 25 is held against rotation when the shell 24 is caused to rotate then the collar 16 will move relative to the plate 21 against the centring effect of the springs 24 until such time that the dogs 23 engage one end of their respective cut-out 22 whereafter the ring gear 25 will be driven by the shell 14. However, it will be recognised that the springs 24 provide a cushioning or shock absorbing effect minimising the transmission of sudden changes in rotational speed of the shell 14 to the ring gear 25.

Housed within the shell 14 and secured to the shaft 15 is a step-up gearbox 19 assembled on a cast or machined metal frame 26 which is longitudinally apertured to receive the shaft 15. The frame 26 is anchored to the shaft 15 so as to define part of the fixed components of the roller assembly. The gearbox 19 includes a plurality of shafts rotatably received within the frame and carrying respective gears. The exact arrangement of gears is not of particular significance except in that it provides a speed step-up between the input gear and the output gear. One particular convenient gearbox arrangement is shown in FIG. 8. The gearbox includes an input gear 27 at the end of the gearbox adjacent the ring gear 25, the input gear 27 meshing with the teeth in the ring gear 25.

With particular reference to FIG. 8 the sequence of gears in the gearbox 19 is as follows. The input gear 27 driven by the ring gear 25 is in mesh with a gear 28 carried at one end of a rotatable shaft, the other end of which carries the gear 29. Gear 29 meshes with gear 31 which in turn has gear 32 rotatably secured thereto. Gear 32 meshes with gear 33 which is carried at one end of a rotatable shaft, the opposite end of which carries a gear 34. Gear 34 meshes with gear 35 which in turn is rotatably secured to gear 36. Gear 36 is the output gear of the gearbox and the dimensions of the gears intermediate gear 27 and gear 36 is such that for a single rotation of the gear 27 the output gear 36 is rotated a plurality of times.

The frame 26 of the gearbox 19 includes a radially outwardly extending flange 38 to which is secured an electrical generator 39. The input shaft of the generator 39 extends parallel to the shaft 15 and carries a gear 41 which meshes with the output gear 36 of the gearbox 19. Accordingly, rotation of the shell 14 relative to the shaft 15 drives the generator 39 through the intermediary of the shock absorbing mechanism and the step-up gearbox 19 so that rotation of the shell 14 produces an electrical output from the generator 39.

An arcuate printed circuit board 42 is secured to the frame 26 of the gearbox 19 at its end remote from the ring gear 25 so as to be fixed in use. The printed circuit board 42 carries two Hall-effect sensors angularly spaced from one another, but lying at the same radial distance from the axis of the shaft 15. In addition, the circuit board 42 carries signal processing circuitry and a drive circuit for a solenoid 43 also carried by the frame 26. As will become apparent all of the circuits and sensors on the board 42 and the solenoid 43 are powered by the output from the generator 39.

Disposed within the shell 14 and anchored thereto is an annular ring 44 concentric with the shaft 15. The ring 44 carries three angularly spaced permanent magnets 45 on its face presented to the circuit board 42 the magnets 45 co-operating, in use, with the Hall-effect sensors on the board 42. The ring 44 is a push fit within the shell 14 and thus rotates therewith.

A pawl 46 (FIG. 13) to be described in more detail hereinafter, is pivotally mounted in a recess (not shown) in the rear the face of the ring 44 remote from the printed circuit board 42, the pivot axis of the pawl 46 extending parallel to the axis of the shaft 15 and the pawl itself extending generally circumferentially of the ring 44, and protruding radially inwardly beyond the inner periphery of the ring 44. Also to be described in more detail hereinafter the solenoid 43, when actuated, co-operates with the pawl 46 through the intermediary of a trip lever 47 pivotally mounted to the end face of the frame 26 of the gearbox 19 for movement about an axis generally radially disposed with respect to the shaft 15.

Disposed around the shaft 15 within the roller shell 14, and adjacent the end of the shaft remote from the ring gear 25 is a brake assembly comprising a metal brake disc 48 mounted for rotation on the shaft 15 through the intermediary of a cylindrical bush 49. The outer diameter the disc 48 is slightly less than the inner diameter of the shell 14 so that the shell 14 can rotate relative to the disc 48. The face of the disc 48 presented towards the gearbox 19 is in close proximity to the rear face of the ring 44 and an externally toothed extension 51 of the disc 48 projects into the ring 44 so as to be able to co-operate with the pawl 46. Pressing against the face of the disc 48 remote from the ring 44 is a stainless steel disc 52 which is urged against the face of the disc 48 by a Bellville washer 53. The bush 49, the disc 48, the disc 52 and the Bellville washer 53 are all apertured to receive the shaft 15 as is a nut 54 which clamps the assembly 48, 49, 52, and 53 against a shoulder 55 on the shaft 15. The nut 54 engages a screw threaded region (not shown) of the shaft 15 and loads the spring washer 53 against the disc 52. The face of the disc 48 presented to the disc 52 has friction material 48a bonded thereto. The central aperture of the disc 52 has a pair of oppositely directed notches which receive pins 56 protruding from the shaft 15 so as to anchor the disc 52 against rotation relative to the shaft. It will be recognised therefore that since the disc 52 cannot rotate and is pressed against the surface 48a of the disc 48 then the normal operating mode will be for the disc 48 to be stationary also.

The assembly of the roller is completed by an annular steel hub 57 which is a push fit in the end of the shell 14 remote from the collar 16 and which receives a bearing arrangement 58 similar to the bearing assembly 17 supporting the hub 57 rotatably on the shaft 15. An end screw 59 similar to the end screw 18 is engaged in a threaded counter bore in the end of the shaft 15 and additionally the screws 18, 58 serve to anchor the roller assembly within the support bracket 13. Conveniently the shaft 15 has flats 61 at at least one end thereof which co-operate with abutting surfaces on the support bracket 13 to ensure that the shaft is non-rotatably fixed to the bracket. A pin 62 extends radially through a corresponding passage in the frame 26 of the gearbox 19 and also through a transverse bore in the shaft 15 to locate the gearbox in a predetermined angular position relative to the shaft.

Figure 11:
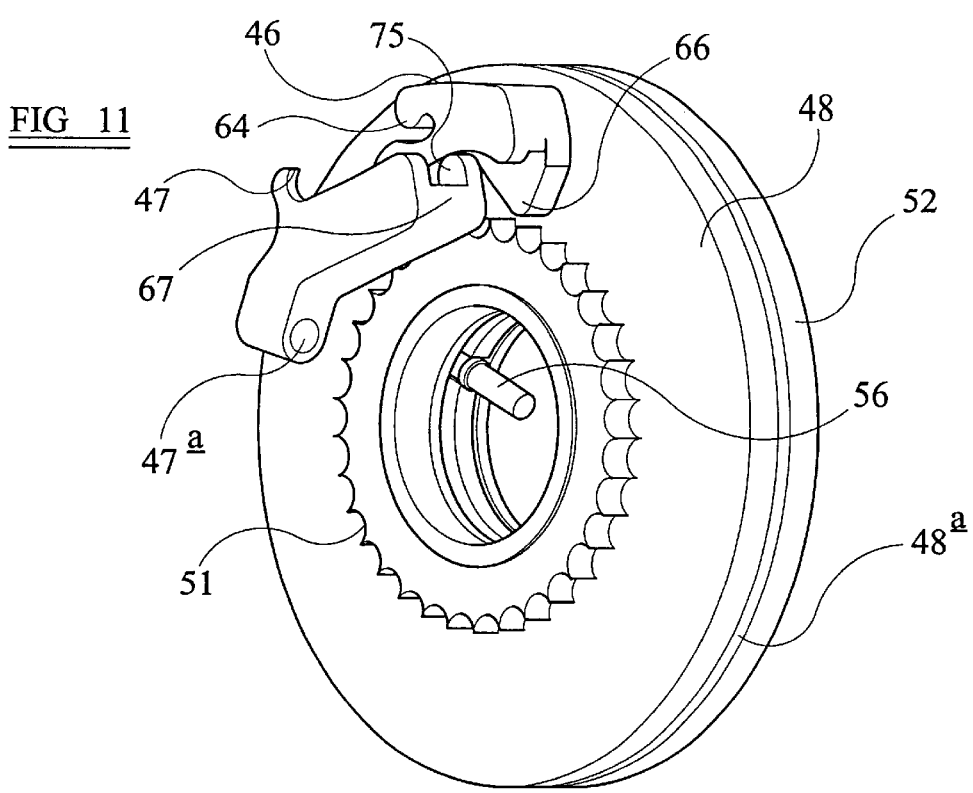
FIGS. 11 and 12 are diagrammatic perspective views illustrating actuation of a brake assembly of the roller.
Figure 12:
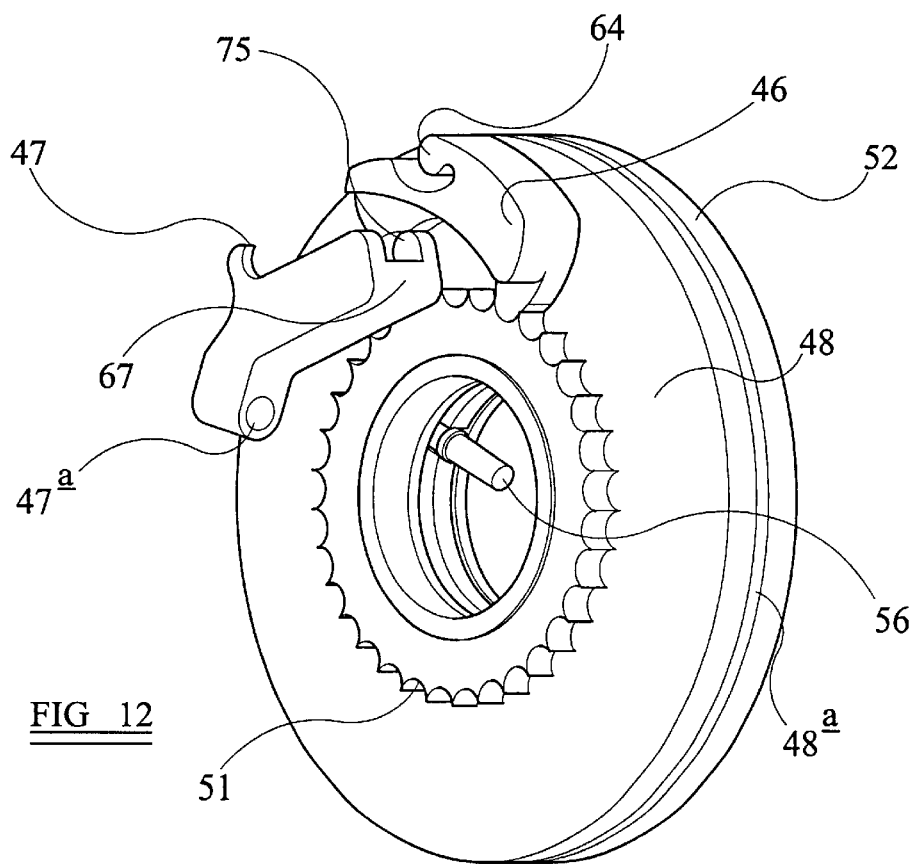
Figure 13:
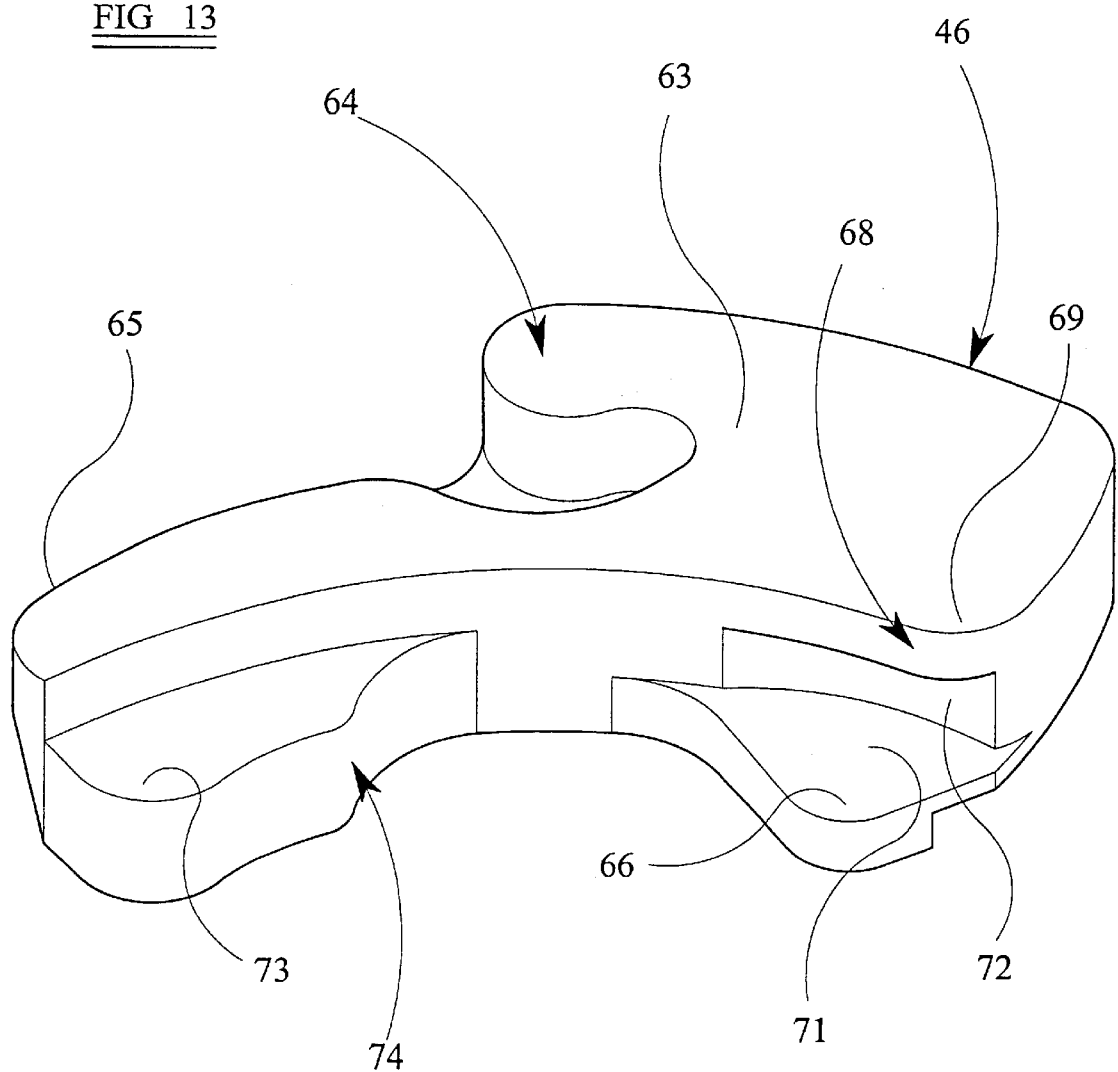
FIG. 13 is an enlarged perspective view of a pawl of the brake assembly illustrated in FIGS. 11 and 12.

Referring now to FIGS. 11, 12 and 13 it will be noted that FIGS. 11 and 12 are shown with the ring 44 omitted for clarity. The pawl 46 has a main body portion 63 which is received within the aforementioned recess in the rear face of the ring 44. The radially outermost region of the body portion 63 of the pawl has a generally cylindrical formation 64 which co-acts with a correspondingly shaped region of the recess in the ring 44 to mount the pawl 46 to the ring 44 for pivotal movement through a limited angular range about a pivotal axis extending parallel to the axis of the shaft 15. In essence the pawl 46 can perform a rocking movement relative to the ring 44 about the axis of the region 64. A compression spring (not shown) acts between the ring 44 and one end region 65 of the pawl to urge the pawl to pivot relative to the ring 44 in a counter-clockwise direction (as viewed in FIGS. 11, 12 and 13). Such pivotal movement of the pawl 46 relative to the ring 44 under the action of the radially extending compression spring moves a nose region 66 at the rear, clockwise end of the pawl 46 away from the teeth of the toothed extension 51 of the brake disc 48, it being recalled that the extension 51 extends into the ring 44. Pivoting the pawl 46 relative to the ring 44 clockwise, against the action of said spring, engages the nose region 66 of the pawl between adjacent teeth of the extension 51 of the brake disc 48 thereby locking the ring 44 carrying the pawl 46 to the disc 48 so that the brake disc 48 is forced to rotate with the roller shell 14 relative to the fixed brake pad 52. During such movement rotation of the roller shell 14 is braked by the frictional engagement of the friction lining 48a provided on the disc 48 with the mutually presented face of the non-rotatable disc 52.

It will be recalled that the operation of the pawl 46 is controlled by the solenoid 43 through the intermediary of the pivoted trip lever 47. The trip lever is probably best seen in FIGS. 11 and 12 from which it can be noted that the trip lever is arcuate, and elongate. The trip lever 47 extends generally circumferentially, and is positioned on the frame 26 of the gearbox 19 at the face of the ring 44 remote from the pawl 46. However, the radial positioning of the trip lever 47 is such that the trip lever 47 can be pivoted relative to the frame 26 to extend into the ring 44 and so co-operate with a portion of the pawl 46 extending radially inwardly from the ring. As is apparent from FIGS. 11 and 12 the pivot axis 47a of the trip lever 47 extends through one end of the trip lever such that the opposite end 67 of the trip lever can extend into the ring 44 when the trip lever is pivoted. It follows therefore that the end 67 of the trip lever 47 can co-operate with a radially inwardly protruding portion of the pawl 46 when the trip lever is pivoted from a rest position by operation of the solenoid 43. However as will become clear hereinafter even in the rest position the trip lever lies in the rotational plane of part of the pawl.

The operation of the roller assembly is as follows. As a ULD moves relative to the roller assembly, in contact with the surface of the roller shell 14 the roller shell will be caused to rotate by the ULD. Provided that the rotational speed of the shell 14 is less than a predetermined threshold value, conveniently 100 rpm, the roller will rotate freely on the bearings 17, 58 and the only resistance to rotation will be the friction in the bearings and friction in the gearbox 19 and generator 39. The braking assembly will not be operative, since the pawl 46 will not engage the teeth of the extension 51 and thus the disc 48 will remain stationary. During such operation therefore the resistance to rotation of the roller is very low, and can be seen, in FIG. 1, to be of the order of 0.5 Nm (four inch pounds) torque.

The rotational speed of the roller is monitored by the speed sensor circuitry on the printed circuit board 42. A pulse is generated each time a magnet 45 passes a Hall-effect sensor and the speed sensing circuit compares the time between pulses with internal timers to calculate the speed of rotation of the roller. While the roller is rotating current is generated by the generator 39, and when the speed of rotation exceeds the predetermined threshold, conveniently 100 rpm, this is detected by the speed sensor circuitry which uses current generated by the generator 39 to energise the drive circuit of the solenoid 43 thus energising the solenoid. Operation of the solenoid 43 moves the trip lever 47 against the action of a torsion return spring from its rest position clear of the pawl 46 and ring 44, to an operative position in which the free end 67 of the trip lever projects into the ring 44 and lies in the path of the radial inner edge of the pawl 46. It will be recognised of course that the pawl 46 is rotating with the ring 44 which in turn is carried by the roller shell 14.

The radially innermost edge of the pawl 46 defines three distinct regions. Firstly there is the nose region 66 which, as described above, can co-operate with the teeth of the extension 51 of the disc 48 to ensure that the disc 48 is driven by the shell 14. In addition, the pawl has, adjacent the nose region 66, a first cam surface 68 defined by the profiling of the radially innermost edge of a flange 69 of the pawl, the flange 69 being spaced axially of the roller assembly from a second, parallel, flange 71 which defines the nose region 66. The flange 69 is spaced from the flange 71 by a groove 72 in the radially innermost edge of the pawl 46, the flange 71 being at the rear face of the pawl.

The radially innermost edge of the counter-clockwise end 65 of the pawl 46 has a further radially inwardly extending flange 73 the radially innermost edge of which is profiled to define a second cam surface 74. The flange 73 is aligned circumferentially of the pawl 46 with the flange 71 and the groove 72, and the thickness (measured axially of the roller) of the flange 73 is equal to the width of the groove 72 and the flange 71 combined.

The free end of the trip lever 67 terminates, at its face presented to the disc 48, in an upwardly extending cam follower 75 (FIGS. 11 and 12) the thickness of which is slightly less than the width of the groove 72 of the pawl. When the trip lever is actuated by the solenoid 43 its end 67 is displaced into the ring 44 by an amount such that the cam follower 75 aligns with the plane of the groove 72. Thus as the roller shell 14 rotates in a clockwise direction the cam follower 75 of the trip lever does not co-operate with the cam surface 68 of the pawl, and instead passes along the groove 72 as the pawl moves past the cam follower. Moreover the pawl is in a counter-clockwise rest position under the action of its return spring and so the flange 69 of the pawl is spaced radially outwardly from the cam follower 75. However, the cam surface 74 on the flange 73 does lie in line with the cam follower 75, and thus as the trailing edge (for clockwise rotation) of the pawl co-operates with the cam follower 75 the co-action of the cam follower 75 and the cam surface 74 pivots the pawl 46 against the action of its return spring to engage the nose region 66 of the pawl between adjacent teeth on the extension 51 of the brake disc 48. Thereafter the brake disc 48 is driven by the roller shell 14 through the intermediary of the pawl 46 and the extension 51. Even though the pawl moves beyond the position of the actuated trip lever 47 as the shell 14 and ring 44 rotate, the nose region 66 of the pawl remains engaged between adjacent teeth of the extension 51 by virtue of friction between the teeth and the nose region 66. Naturally, should rotation of the roller shell 14 cease at this point then the load imposed against the teeth by the nose region 66 will be relieved, and the pawl will then be free to be pivoted under the action of its return spring to withdraw the nose region 66 from the teeth of the extension 51. However, while the roller shell 14 continues to rotate the nose region 66, once engaged between adjacent teeth of the extension 51, will continue to remain in such engagement so that the drive connection between the shell 14 and the brake disc 48 is maintained. It will be recognised therefore that rotation of the shell 14 is heavily braked by the frictional engagement of the friction surface 48a on the brake disc 48 with the non-rotatable disc 52.

With reference to FIG. 1 it can be seen that immediately the rotational speed threshold is exceeded the resistance to rotation of the roller increases virtually instantaneously to a little less than 4.0 Nm (36 inch pounds) torque in this particular application of the roller. However it will be recognised that value of the resistance to rotation will be selected to suit the application for which the roller is intended. The resistance to rotation of the roller is of course converted to resistance to movement and therefore braking action on the ULD engaged with the roller thereby controlling the speed of movement of the ULD. As mentioned above if rotation of the roller ceases then the braking action is discontinued by the pawl return spring disengaging the nose region of the pawl from the teeth of the extension 51. However, if rotation does not cease, but the speed of rotation drops below the threshold value of 100 rpm then the speed sensing circuitry will recognise that the speed of rotation is below the threshold and will cease energisation of the solenoid 43. The trip lever 47 will thus be allowed to pivot back to its rest position under the action of its torsion return spring, and in the rest position of the trip lever the cam follower 75 of the trip lever is spaced axially from the plane of movement of the flange 73 of the pawl, but coincides with the plane of movement of the flange 69 of the pawl. Thus in its rest position the trip lever cam follower 75 will co-act with the cam surface 69 of the pawl provided that the nose region 66 is engaged with teeth of the extension 51. Since the cam surface 68 is at the opposite side of the pivot axis of the pawl from the cam surface 74 the effect of engagement of the cam follower 75 with the cam surface 68 is to pivot the pawl in a counter-clockwise direction lifting the nose region 66 out of engagement with the teeth of the extension 51 and thus disconnecting the brake disc 48 from the roller shell 14. Immediately the nose region 66 disengages from the teeth then the pawl return spring will take over moving the pawl fully to its rest position so that the cam profile 68 is spaced radially outwardly from the cam follower 75.

It will be recognised therefore that rotation of the roller at speed below the threshold rotational speed is not impeded by the brake, whereas immediately the speed of the roller exceeds the threshold value the braking system becomes operative. Should the speed then fall below the threshold the brake action is discontinued, and similarly should the roller come to an instantaneous halt then again the brake will be uncoupled from the roller. It will further by recognised that the braking and disengagement of braking functions operate similarly irrespective of the direction of rotation of the roller. However, it may be desirable in some applications to ensure that braking action can only occur when the rotational speed exceeds a threshold speed with the roller rotating in one particular direction. The intention is that rotation in the opposite direction shall not be impeded by the brake irrespective of the rotational speed. Such an objective is achieved by arranging the speed sensing circuit to be sensitive also to the direction of rotation. As an example, the magnets 45 on the ring 44 could be arranged asymmetrically, rather than spaced by 120° from one another as is the case in the example described above. An asymmetric arrangement of magnets would permit the circuitry associated with the Hall-effect sensors to determine speed and direction of rotation such that the solenoid drive circuit would be operated only when the rotational speed of the roller exceeds the threshold value for rotation in a preselected direction. As an alternative however a mechanical arrangement could be incorporated to ensure that the trip lever cannot be actuated to co-act with the pawl unless the rotation of the roller is in the predetermined direction.

What we claim is:

1. A conveyor roller assembly comprising a support through which the roller assembly can be fixed in use, a hollow, generally cylindrical roller shell supported for rotation about its longitudinal axis on said support, an electrical generator housed within said roller shell and driven thereby by rotation of the shell to produce an electrical output, a brake within said roller shell and operable to brake rotation of said shell relative to said support, a speed sensor within said shell for sensing the speed of rotation of said shell relative to said support, and, an actuator powered by the electrical output of said generator when said speed sensor detects that the speed of rotation of said shell relative to said support exceeds a predetermined value, to effect operation of said brake to brake rotation of the shell.

2. A conveyor roller assembly as claimed in claim 1 including a shock absorbing mechanism is interposed between the roller shell and the drive input of said generator to cushion any sudden speed changes of the roller shell relative to said support.

3. A conveyor roller assembly as claimed in claim 2 wherein said shock absorbing mechanism comprises first and second components capable of limited relative rotation and resilient means interposed between the components to transmit drive therebetween.

4. A conveyor roller assembly as claimed in claim 1 wherein rotation of said roller shell is transmitted to said generator means through the intermediary of a step-up gearbox within the roller shell.

5. A conveyor roller assembly as claimed in claim 1 wherein said speed sensor is arranged also to determine the direction of rotation of the shell relative to said support whereby said actuator may be actuated by rotation of the roller shell relative to said support in one direction only.

6. A conveyor roller assembly as claimed in claim 1 wherein said actuator includes an electromechanical mechanism for linking said shell to a brake component rotatable with the shell relative to a stationary brake component with which it makes frictional contact.

7. A conveyor roller assembly as claimed in claim 6 wherein said electromechanical mechanism includes a solenoid and a pawl moved by energisation of the solenoid to link the roller shell to said brake component.

8. A conveyor roller assembly as claimed in claim 1 wherein said speed sensor includes at least one Hall Effect device and one or more permanent magnets movable with said roller shell relative to said device.

\* \* \* \* \*